United States Patent
Al-Qasim et al.

(10) Patent No.: US 11,384,280 B1
(45) Date of Patent: Jul. 12, 2022

(54) ADSORPTION IMPROVED WATER IN SUPERCRITICAL CO2 ENCAPSULATION FOR IMPROVED OIL RECOVERY

(71) Applicant: SAUDI ARABIAN OIL COMPANY, Dhahran (SA)

(72) Inventors: Abdulaziz S. Al-Qasim, Dammam (SA); Yuguo Wang, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/213,427

(22) Filed: Mar. 26, 2021

(51) Int. Cl.
| | |
|---|---|
| *C09K 8/594* | (2006.01) |
| *E21B 43/16* | (2006.01) |
| *B82Y 30/00* | (2011.01) |
| *B82Y 35/00* | (2011.01) |
| *B82Y 40/00* | (2011.01) |

(52) U.S. Cl.
CPC .............. *C09K 8/594* (2013.01); *B82Y 30/00* (2013.01); *B82Y 35/00* (2013.01); *E21B 43/166* (2013.01); *B82Y 40/00* (2013.01); *C09K 2208/10* (2013.01)

(58) Field of Classification Search
CPC .... C09K 8/594; C09K 2208/10; B82Y 30/00; B82Y 35/00; B82Y 40/00; E21B 43/166
See application file for complete search history.

(56) References Cited

U.S. PATENT DOCUMENTS

| | | | |
|---|---|---|---|
| 7,373,977 B1 | 5/2008 | Berger et al. | |
| 9,604,194 B2 | 3/2017 | Wang et al. | |
| 10,214,680 B2 | 2/2019 | Barati Ghahfarokhi | |
| 2009/0054272 A1 | 2/2009 | Prud'Homme et al. | |
| 2010/0243248 A1 | 9/2010 | Golomb et al. | |
| 2011/0272156 A1* | 11/2011 | Johnson, Sr. ............ | C09K 8/80 166/308.1 |
| 2013/0109879 A1 | 5/2013 | Berger et al. | |
| 2014/0131046 A1 | 5/2014 | Al-Otaibi et al. | |
| 2016/0024374 A1 | 1/2016 | Sadan et al. | |

(Continued)

FOREIGN PATENT DOCUMENTS

| | | |
|---|---|---|
| CA | 3008942 A1 | 6/2017 |
| EP | 2902361 A1 | 8/2015 |

(Continued)

OTHER PUBLICATIONS

Kyakuno, et al., Amorphous water in three-dimensional confinement of zeolite-templated carbon, Chemical Physics Letters 2013; 571: 54-60 (Year: 2013).*

(Continued)

*Primary Examiner* — Daniel C. McCracken
(74) *Attorney, Agent, or Firm* — Osha Bergman Watanabe & Burton LLP

(57) ABSTRACT

A dispersion of capsules in critical or supercritical carbon dioxide is provided. The capsules include an aqueous solution encapsulated by zeolite-templated carbon particles. Also provided is a method of making a dispersion of aqueous solution capsules. The method includes providing a medium of critical or supercritical carbon dioxide, introducing the aqueous solution into the critical or supercritical carbon dioxide medium, and introducing a zeolite-templated carbon particle into the critical or supercritical carbon dioxide medium. Associated methods of using the disclosed dispersions in hydrocarbon-bearing formations are also provided.

20 Claims, 4 Drawing Sheets

(56) References Cited

U.S. PATENT DOCUMENTS

| | | |
|---|---|---|
| 2017/0198201 A1 | 7/2017 | Chang |
| 2017/0225146 A1 | 8/2017 | Wang et al. |
| 2017/0225147 A1 | 8/2017 | Wang et al. |
| 2018/0320056 A1 | 11/2018 | Mazyar et al. |
| 2018/0327658 A1 | 11/2018 | Al-Harbi et al. |
| 2019/0345374 A1 | 11/2019 | Al-Otaibi et al. |
| 2020/0308080 A1 | 10/2020 | Gamot et al. |

FOREIGN PATENT DOCUMENTS

| | | | | |
|---|---|---|---|---|
| WO | 201664611 A1 | 4/2016 | | |
| WO | 2016115142 A1 | 7/2016 | | |
| WO | 2016205289 A1 | 12/2016 | | |
| WO | WO 2016/205289 | * 12/2016 | ............... | C09K 8/58 |
| WO | 2019140340 A1 | 7/2019 | | |

OTHER PUBLICATIONS

Anderson et al.; "First-Principles Prediction of Liquid/Liquid Interfacial Tension", Journal of Chemical Theory and Computation, vol. 10, Issue 8, May 28, 2014, pp. 3401-3408 (8 pages).
Voronina et al., "Physical foaming of fluorinated ethylene-propylene (FEP) copolymers in supercritical carbon dioxide: single-film fluropolymer piezoelectrets". Applied Physics A—Materials Science & Processing, vol. 90, Issue 4, Mar. 2008, pp. 615-618 (4 pages).
Zhang, Y et al., "Dissolution of surfactants in supercritical $CO_2$ with co-solvents", Chemical Engineering Research and Design, vol. 94, Feb. 2015, pp. 624-631 (8 pages).
Rudyk et al., "Supercritical carbon dioxide extraction of oil sand enhanced by water and alcohols as Co-solvents", Journal of $CO_2$ Utilization, vol. 17, Jan. 2017, pp. 90-98 (9 pages).
Jaime Wisniak and Jacob Zabicky, "The Chemistry of Jojoba Oil", Proceedings of the Sixth International Conference on Jojoba and its Uses, 1985, pp. 311-322 (7 pages).
"Graphene properties (A Complete Reference)", Jul. 15, 2021; Retrieved from the Internet: URL: http://www.graphene-battery.net/graphene-properties.htm (2 pages).
Li et al., "Field and Temperature dependence of intrinsic diamagnetism in graphene: Theory and experiment", Physical Review B, vol. 91, Issue 9, Mar. 1, 2015 (5 pages).
Shinn et al., "Nuclear Energy Conversion with Stacks of Graphene Nanocapacitors", Complexity, vol. 18, Issue 3, Oct. 22, 2012, pp. 24-27 (4 pages).
A.K. Geim and K.S. Novoselov, "The Rise of Graphene", Nature Materials, vol. 6, Apr. 2007, pp. 1-14 (14 pages).
Kawaguchi et al., "Electronic structure and intercalation chemistry of graphite-like layered material with a composition of BC6N", Journal of Physics and Chemistry of Solids, vol. 69, Issues 5-6, May 2008, pp. 1171-1178 (8 pages).
Lee et al., "A route towards superhydrophobic graphene surfaces: surface-treated reduced graphene oxide spheres", Journals of Materials Chemistry A, vol. 1, Issue 25, 2013, pp. 7312-7315 (4 pages).
Zhang et al., "Biomimetic graphene films and their properties", Nanoscale, vol. 4, Issue 16, Jun. 6, 2012, pp. 4858-4869 (12 pages).
Wang et al., "Biomimetic Graphene Surfaces with Superhydrophobicity and Iridescence", Chemistry an Asian Journal, vol. 7, Issue 2, Feb. 6, 2012, pp. 301-304 (4 pages).
Zhang et al., "Super-hydrophobic graphene coated polyurethane (GN@PU) sponge with great oil-water separation perfomance". Applied Surface Science, vol. 422, Nov. 2017, pp. 116-124 (9 pages).
Zengguo Bai and Bin Zhang, "Fabrication of superhydrophobic reduced-graphene oxide/nickel coating with mechanical durability, self-cleaning and anticorrosion performance", Nano Materials Science, vol. 2, Issue 2, Jun. 2020, pp. 151-158 (8 pages).
Wang et al., "Recent developments in superhydrophobic graphene and graphene-related materials: from preparation to potential applications", Nanoscale, Issue 16, Mar. 12, 2015 (15 pages).
Kumari et al., "Corrosion-Resistant Hydrophobic Nanostructured Ni-Reduced Graphene Oxide Composite Coating with Improved Mechanical Properties", Journal of Materials Engineering and Performance, vol. 27, Issue 18, Oct. 23, 2018, pp. 5889-5898 (9 pages).
Zhang et al., "One-step fabrication of robust superhydrophobic and superoleophilic surfaces with self-cleaning and oil/water separation function", Scientific Reports, vol. 8, Mar. 2018, pp. 1-12 (12 pages).
Boinovich et al., "Origins of Thermodynamically Stable Superhydrophobicity of Boron Nitride Nanotubes Coatings", Langmuir, vol. 28, No. 2, Jan. 17, 2012, pp. 1206-1216 (11 pages).
Aliev et al., "Superhydrophobic Coatings Based on Boron Nitride Nanotubes: The Mechanism of Superhydrophobicity and Self-Regeneration of Highly Hydrophobic Properties", Nanotechnologies in Russia, vol. 6, Nos. 11-12, Dec. 23, 2011, pp. 723-732 (10 pages).
Lee et al., "Superhydrophobicity of Boron Nitride Nanotubes Grown on Silicon Substrates", Langmuir, vol. 25, No. 9, Apr. 8, 2009, pp. 4853-4860 (8 pages).
Zhou et al., "Superhydrophobic hBN-Regulated Sponges with Excellent Absorbency Fabricated Using a Green and Facile Method", Scientific Reports, vol. 7, Mar. 23, 2017, pp. 1-10 (10 pages).
Diao et al., "Oil adsorption performance of graphene aerogels", Journal of Materials Science, vol. 55, Dec. 16, 2019, pp. 4578-4591 (14 pages).
Petridis et al., "Advanced Low-Cost Separation Techniques in Interface Science", Elsevier, Ch. 8, vol. 30, 2019, pp. 173-197 (25 pages).
Ning et al.; "High capacity oil adsorption by graphene capsules"; Nanoscale; Issue 34; Jul. 27, 2017 (5 pages).
Chen et al.; "Graphene Sponge as an Efficient and Recyclable Oil Sorbent"; AIP Conference Proceedings; vol. 1877; Issue 1; Sep. 11, 2017; pp. 030005-1-030005-10 (10 pages).
Marchesini et al.; "Porous Boron Nitride Materials: Influence of Structure, Chemistry and Stability on the Adsorption of Organics", Frontiers in Chemistry; vol. 7; Mar. 2019; pp. 1-9 (9 pages).
Li et al.; "Tuning the Chemical Hardness of Boron Nitride Nanosheets by Doping Carbon for Enhanced Adsorption Capacity", ACS Omega; vol. 2; Issue 9; Sep. 1, 2017; pp. 5385-5394 (10 pages).
J. Luo et al.; "Activated boron nitride ultrathin nanosheets for enhanced adsorption desulfurization performance" Journal of the Taiwan Institute of Chemical Engineers; vol. 93; Dec. 2018; pp. 245-252 (8 pages).
A. K. Mishra and S. Ramaprabhu; "Carbon dioxide adsorption in graphene sheets"; AIP Advances; vol. 1; Issue 3; Sep. 1, 2011; p. 032152-1-032152-6 (6 pages).
D. Iruretagoyena et al.; "Adsorption of carbon dioxide on graphene oxide supported layered double oxides", Adsorption; vol. 20; Dec. 5, 2013; pp. 321-330 (10 pages).
W Othman et al.; "Adsorption of $CO_2$ on Fe-doped graphene nano-ribbons: Investigation of transport properties" Journal of Physics: Conference Series; vol. 869; Jul. 2017 (4 pages).
Xu et al.; "The $CO_2$ Storage Capacity of the Intercalated Diaminoalkane Graphene Oxides: A Combination of Experimental and Simulation Studies"; Nanoscale Research Letters; vol. 10; Aug. 8, 2015; pp. 1-10 (10 pages).
Sun et al.; "Charge-Controlled Switchable $CO_2$ Capture on Boron Nitride Nanomaterials", Journal of the American Chemical Society; vol. 135; Issue 22; May 2013 (9 pages).
Li, J et al.; "Activated boron nitride as an effective adsorbent for metal ions and organic pollutants"; Scientific Reports; vol. 3; Nov. 13, 2013; pp. 1-7 (7 pages).
Mao, X et al.; "Metal-free graphene/boron nitride heterointerface for $CO_2$ reduction: Surface curvature controls catalytic activity and selectivity"; vol. 2; Issue 1; Jan. 19, 2020; pp. 1-8 (8 pages).
Chen, S et al.; "Carbon Doping of Hexagonal Boron Nitride Porous Materials toward $CO_2$ Capture"; Journal of Materials Chemistry A; Issue 4; 2018; pp. 1-9 (9 pages).
Coleman, J. N. et al.; "Two-Dimensional Nanosheets Produced by Liquid Exfoliation of Layered Materials"; Science; vol. 331; Issue 6017; Feb. 4, 2011; pp. 568-571 (4 pages).

(56) References Cited

OTHER PUBLICATIONS

A. Ambrosi and M. Pumera, "Electrochemically Exfoliated Graphene and Graphene Oxide for Energy Storage and Electrochemistry Applications"; Chemistry A European Journal; vol. 22; Issue 1; Jan. 4, 2016; pp. 153-159 (7 pages).
Chen, Z. et al.; "Activated carbons and amine-modified materials for carbon dioxide capture—a review"; Frontiers of Enviromental Science & Engineering; vol. 7; Jun. 2013; pp. 326-340 (15 pages).
Chen, B. et al.; "Atomically homogeneous dispersed ZnO/N-doped nanoporous carbon composites with enhanced CO2 uptake capacities and high efficient organic pollutants removal from water"; Carbon; vol. 95; Aug. 8, 2015; pp. 113-124 (12 pages).
Al Otaibi, M. S.; "Post-Synthesis Functionalization of Porous Organic Polymers for CO2 Capture"; KAUST Research Repository; Jul. 2014; pp. 1-70 (70 pages).
Dawson, R. et al.; "Nanoporous organic polymer networks"; Progress in Polymer Science; vol. 37; Issue 4; Apr. 2012; pp. 530-563 (34 pages).
Maly, K. E.; "Assembly of nanoporous organic materials from molecular building blocks"; Journal of Materials Chemistry; vol. 19; Issue 13; Jan. 14, 2009; pp. 1781-1787 (7 pages).
Jiang, J. and Cooper, A. I.; "Microporous Organic Polymers: Design, Synthesis, and Function"; Topics in Current Chemistry; vol. 293; Sep. 1, 2009; pp. 1-33 (33 pages).
Côté, A. P. et al.; "Porous, Crystalline, Covalent Organic Frameworks"; Science; vol. 310; Nov. 18, 2005; pp. 1166-1170 (5 pages).
El-Kaderi, H. M. et al.; "Designed Synthesis of 3D Covalent Organic Frameworks"; Science; vol. 316; Apr. 13, 2007; pp. 268-272 (5 pages).
Uribe-Romo, F. J. et al.; "A Crystalline Imine-Linked 3-D Porous Covalent Organic Framework"; Journal of the American Chemical Society; vol. 131; pp. 4570-4571 (2 pages).
Duncan J. Shaw; "Introduction to Colloid and Surface Chemistry"; Butterworth-Heinemann; Ch. 10; Feb. 24, 1992; pp. 262-276 (15 pages).
Sun et al.; "Integrating Superwettability within Covalent Organic Frameworks for Functional Coating"; Chem; vol. 4; Jul. 12, 2018; pp. 1-14 (14 pages).
Liu et al.; "A hydrophilic covalent organic framework for photocatalytic oxidation of benzylamine in water"; Chemical Communications; Issue 5; Dec. 10, 2019 (5 pages).
Hou et al.; "Covalent Organic Framework-Functionalized Magnetic CuFe2O4/Ag Nanoparticles for the Reduction of 4-Nitrophenol"; Nanomaterials; vol. 10; Issue 3; Mar. 2020; pp. 1-13 (13 pages).
Li et al.; "Core-Shell Structured Magnetic Covalent Organic Framework Nanocomposites for Triclosan and Triclosan Adsorption"; ACS Applied Materials & Interfaces; vol. 11; Jun. 10, 2019; pp. 22492-22500 (9 pages).
Cai et al.; "Magnetic solid phase extraction and gas chromatography-mass spectrometrical analysis of sixteen polycyclic aromatic hydrocarbons"; Journal of Chromatography A; vol. 1406; Jun. 20, 2015; pp. 40-47 (8 pages).
Kyakuno et al.; "Amorphous water in three-dimensional confinement of zeolite-templated carbon"; Chemical Physics Letters; vol. 571; Apr. 17, 2013; pp. 54-60 (7 pages).
Jiao et al.; "Water under the Cover: Structures and Thermodynamics of Water Encapsulated by Graphene"; Scientific Reports; vol. 7; Sep. 2015; pp. 1-19 (19 pages).
Samara et al.; "Unconventional oil recovery from Al Sultani tight rock formations using supercritical CO2"; The Journal of Supercritical Fluids; vol. 152; Oct. 2019; pp. 1-9 (9 pages).
Han et al.; "Superhydrophobic Covalent Organic Frameworks Prepared via Pore-Surface Modifications for Functional Coatings under Harsh Conditions"; ACS Applied Materials & Interfaces; vol. 12; Nov. 21, 2019; pp. 2926-2934 (40 pages).
Xu et al.; "Organic-Inorganic Composite Nanocoatings with Superhydrophobicity, Good Transparency, and Thermal Stability"; vol. 4; No. 4; Mar. 19, 2010; pp. 2201-2209 (9 pages).
Furukawa, H. and Yaghi, O. M.; "Storage of Hydrogen, Methane, and Carbon Dioxide in Highly Porous Covalent Organic Frameworks for Clean Energy Applications"; Journal of the American Chemical Society; vol. 131; Jun. 4, 2009; pp. 8875-8883 (9 pages).
Geng et al.; "Covalent Organic Frameworks: Design, Synthesis, and Functions"; Chemical Reviews; vol. 120; Issue 16; Jan. 22, 2020; pages CW-DP (20 pages).
Prakesh et al.; "Spontaneous recovery of superhydrophobicity on nanotextured surfaces"; Proceedings of the National Academy of Sciences; vol. 113; No. 20; May 2, 2016; pp. 1-6 (6 pages).
Tie et al.; "Organic Media Superwettability: On-Demand Liquid Separation by Controlling Surface Chemistry"; ASC Applied Materials & Interfaces; vol. 10; No. 43; Oct. 8, 2018 (27 pages).
Liu et al.; "Developments of 'Liquid-like' Copolymer Nanocoatings for Reactive Oil-Repellent Surface"; ACS Nano; vol. 11; No. 2; Feb. 23, 2017; pp. 2248-2256 (9 pages).
Non-Final Office Action issued in corresponding U.S. Appl. No. 17/213,440 dated Mar. 18, 2022 (27 pages).
Non-Final Office Action issued in corresponding U.S. Appl. No. 17/213,449 dated Mar. 28, 2022 (27 pages).
Office Action issued in related U.S. Appl. No. 17/213,411, dated Apr. 22, 2022 (29 pages).

\* cited by examiner

ADSORPTION IMPROVED WATER IN SUPERCRITICAL CO2 ENCAPSULATION FOR IMPROVED OIL RECOVERY

BACKGROUND

During primary oil recovery, oil inside an underground hydrocarbon reservoir is driven to the surface (for example, toward the surface of an oil well) by a pressure difference between the reservoir and the surface. However, only a fraction of the oil in an underground hydrocarbon reservoir can be extracted using primary oil recovery. Thus, a variety of techniques for enhanced oil recovery are utilized after primary oil recovery to increase the production of hydrocarbons from hydrocarbon-bearing formations. Some examples of these techniques include water flooding, chemical flooding, and supercritical $CO_2$ injections.

Supercritical $CO_2$ is an useful fluid for enhanced oil recovery applications due to its chemical and physical properties as well as providing the opportunity to introduce a greenhouse gas into a subterranean area. Supercritical $CO_2$ is miscible with hydrocarbons. Thus, when it contacts hydrocarbon fluid in a reservoir, the fluid is displaced from the rock surfaces and pushed toward the production well. Additionally, $CO_2$ may dissolve in the hydrocarbon fluid, reducing the viscosity of the hydrocarbon fluid and causing it to swell. This further enhances the ability to recover hydrocarbons and increase production.

SUMMARY

This summary is provided to introduce a selection of concepts that are further described in the detailed description. This summary is not intended to identify key or essential features of the claimed subject matter, nor is it intended to be used as an aid in limiting the scope of the claimed subject matter.

In one aspect, embodiments disclosed relate to an aqueous solution encapsulated by zeolite-templated carbon particles.

In another aspect, embodiments disclosed relate to a dispersion of capsules in critical or supercritical carbon dioxide, the capsules comprising an aqueous solution encapsulated by zeolite-templated carbon particles.

In yet another aspect, embodiments disclosed relate to a method of making a dispersion of aqueous solution capsules. The method includes providing a medium of critical or supercritical carbon dioxide, introducing the aqueous solution into the critical or supercritical carbon dioxide medium, and introducing a zeolite-templated carbon particle into the critical or supercritical carbon dioxide medium.

In another aspect, embodiments disclosed relate to a method of treating a hydrocarbon-bearing formation. The method includes introducing into a hydrocarbon-bearing formation a dispersion of aqueous solution capsules in a medium of critical or supercritical carbon dioxide. The aqueous solution capsules include an aqueous solution encapsulated by zeolite-templated carbon particles.

Other aspects and advantages of the claimed subject matter will be apparent from the following description and the appended claims.

DETAILED DESCRIPTION

Carbon dioxide ($CO_2$) is widely used in flooding processes for enhanced oil recovery. While it can be effective for oil recovery due to its affinity for hydrocarbons and its ability to be readily used in its supercritical state in hydrocarbon-bearing formations, it suffers from a number of challenges in its use. The density of $CO_2$ is less than many of the fluids present in subterranean formations, including water and the liquid and semi-solid hydrocarbons. Due to this reduced density, $CO_2$ has a tendency to seek upward-directed flow paths in the reservoir as it progresses away from the injection point and through the reservoir. This may lead to the introduced $CO_2$ preferentially bypassing portions of the reservoir and leaving portions of the reservoir untreated. This phenomenon is called "gravity override."

The present disclosure relates to compositions and methods for increasing and maintaining the density of supercritical $CO_2$ by adding an aqueous solution encapsulated by zeolite-templated carbon (ZTC) particles to carbon dioxide in the critical or supercritical state ("SCCO2"). The SCCO2 dispersions described here provide a SCCO2 composition with increased density that does not suffer from the gravity override effect. Such compositions lead to improved sweep efficiency and enhanced oil recovery of the hydrocarbon-bearing formation.

Capsules of Aqueous Solution

Figure 1:
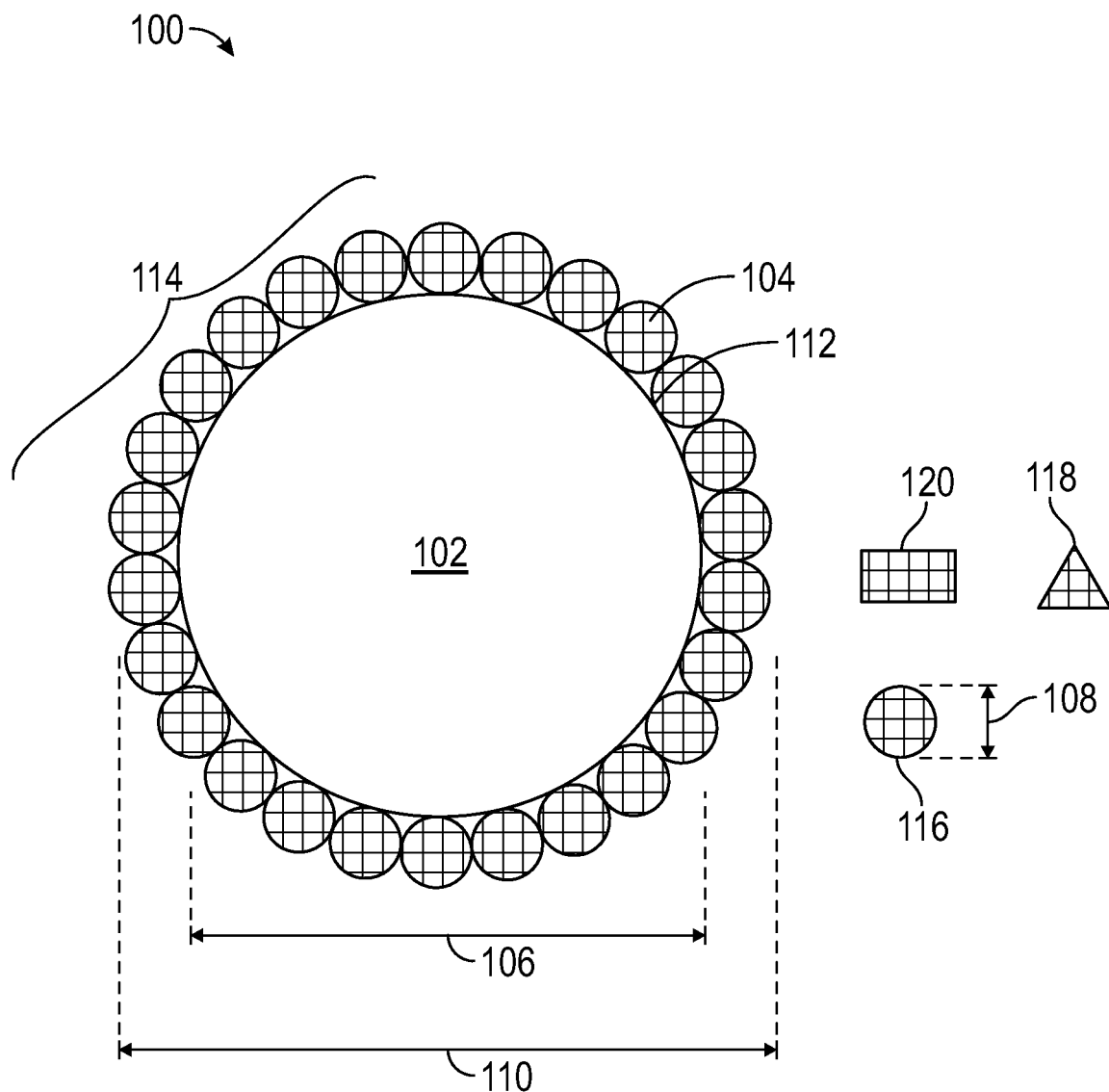
FIG. 1 shows a simplified schematic of an embodiment capsule useful for treating hydrocarbon-bearing formations.

In one aspect, embodiment capsules disclosed relate to an aqueous solution encapsulated by zeolite-templated carbon particles. FIG. 1 shows a simplified schematic of an embodiment capsule useful for treating subterranean formations. FIG. 1 shows a capsule 100 having an aqueous solution 102 that is encapsulated by zeolite-templated carbon (ZTC) particles 104. The aqueous solution 102 as given in capsule 100 has a solution diameter 106. The ZTC particles 104 have a ZTC particle diameter 108. The capsule 100 has a capsule diameter 110. In the embodiment shown in FIG. 1, the surface 112 of the aqueous solution 102 is surrounded by a layer of ZTC particles 104 which form an encapsulating shell 114 around the aqueous solution 102 such that it is encapsulated. Several potential shapes of the ZTC particles 104 are represented, such as spherical 116, pyramidal 118, and cubic 120.

Embodiment capsules include an aqueous solution. For embodiment capsules, the aqueous solution includes water. The water may comprise one or more known compositions of water, including distilled; condensed; filtered or unfiltered fresh surface or subterranean waters, such as water sourced from lakes, rivers or aquifers; mineral waters; gray water; run-off, storm or waste water; potable or non-potable waters; brackish waters; synthetic or natural sea waters; synthetic or natural brines; formation waters; production water; and combinations thereof.

In some embodiments, within the embodiment capsule the aqueous solution is in the form of a liquid, for example, a droplet or sphere. In such embodiments, the solution diameter may have a range of from about 10 nm (nanometers) to about 100 μm (micrometers), meaning the solution diameters have a $D_1$ of about 10 nm and a $D_{99}$ of about 100 μm. In some embodiments, the solution diameter may have a range of from about 10 nm to 200 nm. In other embodiments, the solution diameter may have a range of from about 10 µm to 100 µm. A $D_1$ value means that 1% of the solution diameters have a diameter of less than the $D_1$ value. A $D_{99}$ value means that 99% of the solution diameters have a diameter of less than the $D_{99}$ value.

Embodiment capsules also include a zeolite-templated carbon (ZTC) particle. In some such embodiments, the zeolite-templated carbon particle comprises zeolite-templated carbon (ZTC). The zeolite-templated carbon is made of carbon residue from the reduction of one or more olefin compounds in a zeolite structure, forming a 3-dimensional (3D) carbon matrix.

The zeolite-templated carbon particles may be made by a method that includes introducing an organic precursor gas made of an organic precursor for a chemical vapor deposition (CVD) period to a crystalline zeolite that is maintained at a CVD temperature such that the carbon-zeolite composite forms. The introduced organic precursor adsorbs via CVD into the crystalline zeolite. The organic precursor converts into carbon within the crystalline zeolite. Useful organic precursors for such a process may include propylene, ethanol and acetylene. The carbon within the crystalline zeolite forms a carbon template of the internal void structure of the zeolite. The zeolite templated carbon therefore takes the shape of a negative replica of the crystalline zeolite on a matrix scale. The method includes introducing a non-reactive gas for a thermal treatment period to the carbon-zeolite composite maintained at a thermal treatment temperature such that a thermally-treated carbon-zeolite composite forms. The carbon template of the zeolite within the crystalline zeolite converts into a thermally-treated carbon template of the zeolite. The method includes introducing an aqueous strong mineral acid mixture to the thermally-treated carbon-zeolite composite such that the zeolite templated carbon (ZTC) is freed from the zeolite structure. Additional details regarding the ZTC particles disclosed here may be found in U.S. Pat. No. 9,604,194, which is incorporated by reference in its entirety.

In other such embodiments, the previously-described ZTC particles comprise functionalized ZTC particles. In such embodiments, the ZTC particles may be functionalized with amines, hydroxyl groups, carboxylic acid groups, and combinations thereof, in order to increase their affinity for supercritical $CO_2$.

In other such embodiments, the previously-described ZTC particle comprises doped ZTC particles. In some embodiments, the dopant for the ZTC particles is selected from the group consisting of oxygen, nitrogen, sulfur, iron, zinc, and combinations thereof. The use of such dopants may allow for the tuning of the degree of hydrophobicity of the doped ZTC particles.

On the macro-scale, embodiment zeolite-templated carbon particles may be any appropriate shape useful for encapsulating aqueous solutions. For example, as shown in FIG. 1, ZTC particles are shown as spherical (116), cubic (120), and pyramidal (118); however, geometric and non-geometric configurations are not limited except as to provide for an encapsulating surface for the aqueous solution.

Embodiment zeolite-templated carbon particles may be any appropriate size for encapsulating aqueous solutions. Based upon the configuration or geometry of the form of the ZTC particle, the particle size may be determined by a center-traversing axis parallel with its longest length. So, for example, a sphere may be measured by its diameter; a cube by its diagonal. In some embodiments, the zeolite-templated carbon particles have a particle size in a range of from about 10 to about 200 nm, meaning the ZTCs have a $D_1$ of about 10 nm and a $D_{99}$ of about 200 nm. A $D_1$ value means that 1% of the ZTC particles have a diameter of less than the $D_1$ value. A $D_{99}$ value means that 99% of the particles have a diameter of less than the $D_{99}$ value.

In some embodiments, the zeolite-templated carbon particles are hydrophobic. In such embodiments, the water contact angle of embodiment ZTC particles is from about 90° to about 180°. In some embodiments, the water contact angle of embodiment ZTC particles is less than 150°, such as less than 120°.

In some embodiments, the density of the zeolite-templated carbon particles is the same or greater than the density of water. In such embodiments, the density of water is from about 1.0 to 1.2 g/mL (grams per milliliter), generally corresponding to the density of water under formation conditions.

As described, embodiment capsules include an aqueous solution that is encapsulated by ZTC particles. The aqueous solution is surrounded by the ZTC particles and does not disperse into the medium hosting the capsules. In embodiment capsules, the aqueous solution and the ZTC particles are as previously described.

In some embodiments, capsules have a capsule size range, which is effectively the diameter of the capsule, from about a few nanometers to a few millimeters. In such embodiments, the capsule diameter may have a range of from about 10 nm (nanometers) to about 100 µm (micrometers), meaning the capsules have a $D_1$ of about 10 nm and a $D_{99}$ of about 100 µm. In some embodiments, the capsule diameter may have a range of from about 10 nm to 200 nm. In other embodiments, the capsule diameter may have a range of from about 10 µm to 100 µm. The capsule size range for a given embodiment capsule should be approximately the same in all directions of the roughly spherical shape; however, variations in configuration between a given ZTC particle and another may provide some statistically insignificant differences in determined capsule size range based on one diameter versus another.

Embodiment capsules have a density in a range of from about 0.9 to about 1.2 g/mL.

Dispersion of Capsules in Super/Critical $Co_2$

Figure 2:
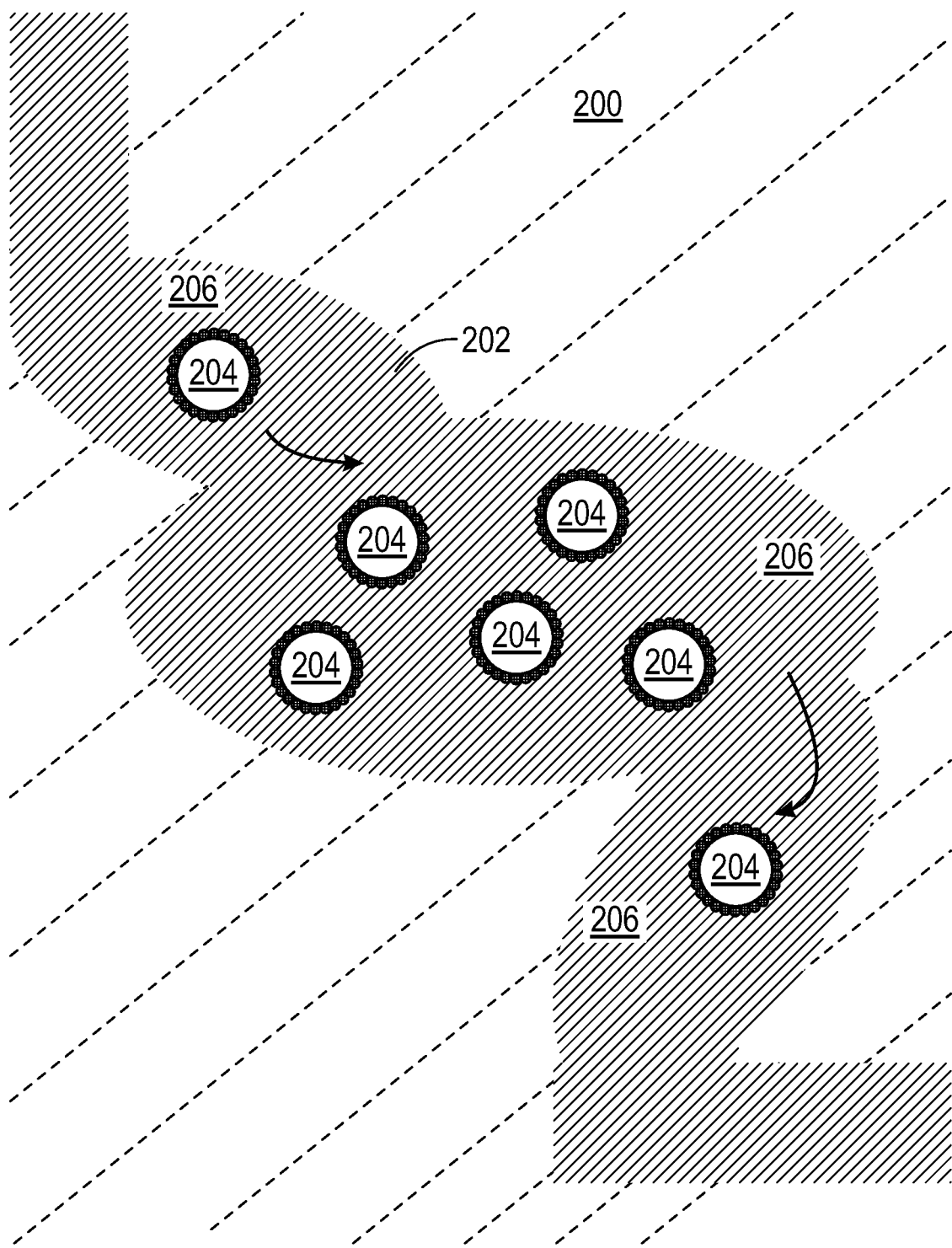
FIG. 2 shows a simplified schematic of an embodiment dispersion in use in a hydrocarbon-bearing formation.

In another aspect, embodiments disclosed relate to a dispersion of the embodiment capsules previously described. FIG. 2 shows a simplified schematic of an embodiment dispersion in use in a hydrocarbon-bearing formation. A hydrocarbon-bearing formation 200 has pores 206 throughout. An embodiment dispersion within pores 206 may include $CO_2$ in the critical or supercritical state ("SCCO2") 202 and capsules 204. Arrows (not labeled) show the direction of flow of the embodiment dispersion through the hydrocarbon-bearing formation.

In embodiment dispersions, a medium of SCCO2 suspends the prior-discussed embodiment capsules. The critical temperature for carbon dioxide is approximately 31.1° C.; the critical pressure is approximately 8.38 MPa (megapascals). In some embodiment dispersions, the carbon dioxide is in a critical state. In some other embodiment dispersions, the carbon dioxide is in a supercritical state. Embodiment dispersions may include SCCO2 in a temperature range of from about 50° C. to about 100° C. Embodiment dispersions may include SCCO2 in a pressure range of from about 1500 psi (pounds per square inch) to about 5000 psi.

In some embodiment dispersions, the carbon dioxide medium may have a purity of at or greater than 90%. The purity of the carbon dioxide is determined before introduction of the capsules into the embodiment dispersion, the introduction of water into the carbon dioxide, or the introduction of the carbon dioxide into a subterranean formation, as any contact may introduce external impurities into the critical or supercritical carbon dioxide. In some embodiment dispersions, the carbon dioxide medium may have a density in a range of from about 0.8 to 0.9 g/mL.

Embodiment dispersions also include capsules as previously described. The capsules are stable in the SCCO2 environment. The ZTC particle and aqueous solution do not physically or chemically degrade or disassociate due to the presence of the SCCO2.

Embodiment dispersions may include a percent volume of water as compared to the total volume of water and SCCO2. Embodiment dispersions may include from about 60 to 70 vol. % of water. A greater water content contributes to an increased density of embodiment dispersions, as water has a greater density than SCCO2 at formation conditions.

Embodiment dispersions may include any suitable amount of ZTC particles. In some embodiments, dispersions may include up to 5.0 wt. % of ZTC particles in terms of the total weight of the dispersion. Embodiment dispersions may have a lower limit of about 1.0, 1.5, 2.0, or 2.5 wt. % ZTC, and an upper limit of about 5.0, 4.5, 4.0, 3.5, or 3.0 wt. % ZTC, where any lower limit may be used in combination with any mathematically compatible upper limit.

Embodiment dispersions may have a bulk density suitable for mitigating gravity override. Such dispersions may have a bulk density of from about 0.9 to 1.1 g/mL at formation conditions. Embodiment dispersions may include in a range of from about 50 to 70 vol. % of embodiment capsules.

Method of Forming a Dispersion

Figure 3:
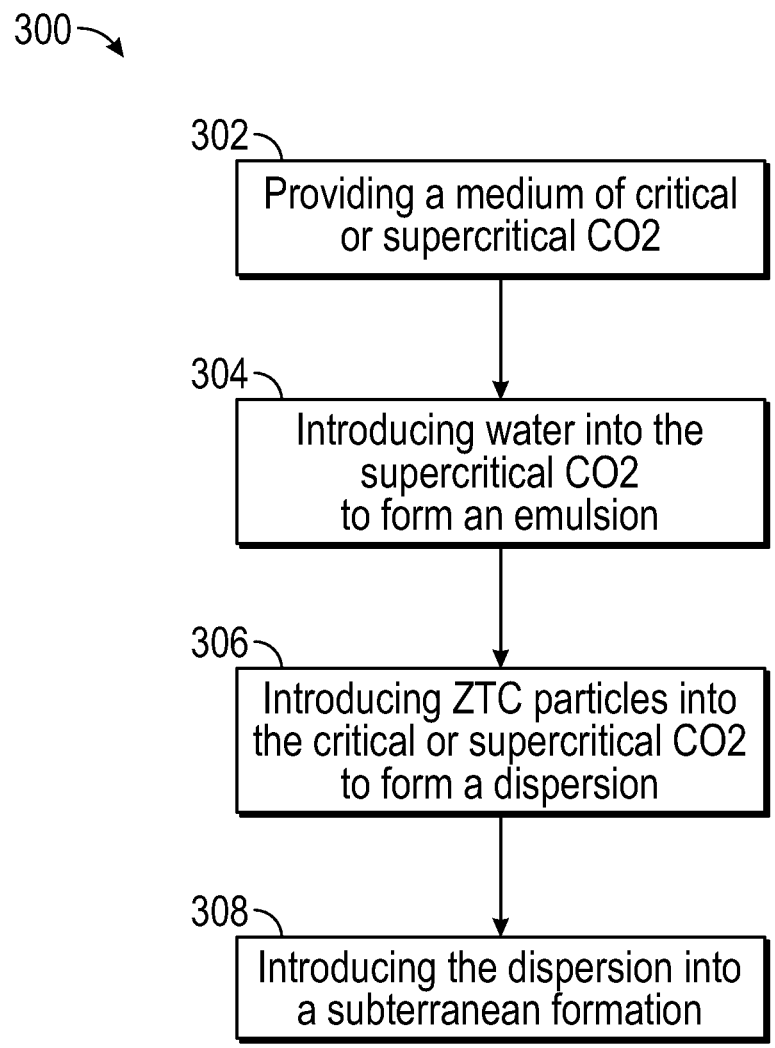
FIG. 3 is a block flow diagram of an embodiment method of making a dispersion.

In another aspect, embodiments disclosed here relate to a method of making the previously-described dispersion. FIG. 3 is a block flow diagram of an embodiment method of making a dispersion 300.

The method 300 may include providing a medium of critical or supercritical carbon dioxide 302. In some embodiments, providing the medium may include introducing SCCO2 into a subterranean formation. In such cases, the dispersion may be produced in situ, that is, within the formation to be treated with the dispersion. As such, the treatment of the formation and the creation of the dispersion occur virtually simultaneously. In other embodiments, the dispersion is fabricated outside of a subterranean formation, such as on the surface or in a production facility.

The method 300 may include introducing water into the SCCO2 such that an emulsion of water in $CO_2$ forms 304. Embodiment SCCO2 may be in a temperature in in a range of from about 50° C. to about 100° C. and a pressure in a range of from about 1500 psi to about 5000 psi when water is introduced. The water may be introduced to SCCO2 by any suitable means in which the previously described temperatures and pressures may be maintained. For example, the water may be introduced by a pump configured to introduce fluids at a temperature and pressure greater than the temperature and pressure of the SCCO2, such by using a high pressure syringe pump. The water/SCCO2 may then be mixed using vigorous stirring to form am emulsion. If ZTC particles are already present in the $CO_2$ as a dispersion, then the ZTC particles encapsulate the aqueous solution and the dispersion forms.

Upon introducing an aqueous solution into a SCCO2 medium, an emulsion of water droplets in SCCO2 may be formed. However, such emulsions may not be stable for extended periods because water and SCCO2 naturally separate due to differences in polarity of the two fluids.

The method 300 may include introducing ZTC particles into the SCCO2 306. The SCCO2 medium in embodiment dispersions may be in a temperature in a range of from about 50° C. to about 100° C. and a pressure in a range of from about 1500 psi to about 5000 psi when ZTC particles are added. Embodiment ZTC particles may be added to embodiment dispersions as a dry powder. Embodiment ZTC particles may be added to the $CO_2$ medium under vigorous stirring to evenly disperse the ZTC particles. The dispersion may then be stirred for about 30 to 60 minutes.

In some embodiments, the water is added to the SCCO2 prior to the addition of the ZTC particles to the SCCO2. If water is present in the SCCO2 medium and an emulsion is already present, the embodiment dispersion may immediately form. The zeolite-templated carbon particles described previously may be provided to the emulsion to encapsulate aqueous solution present, thereby mitigating the polarity difference, stabilizing the aqueous solution in the SCCO2 medium, and forming the dispersion from the emulsion of water and SCCO2. In some embodiments, the ZTC particles are added to the SCCO2 prior to the addition of the water to the SCCO2. If the aqueous solution is not present in the SCCO2 medium, then a dispersion of ZTC particles in the SCCO2 is formed. In some embodiments, the water and ZTC particles may be introduced to the SCCO2 medium simultaneously.

When introduced into an aqueous solution in SCCO2 emulsion, hydrophobic particles, such as the previously-described zeolite-templated carbon particles, may collect at the interfaces between the aqueous solution and the SCCO2, if water is already present in the SCCO2 medium. If water is not present, the ZTC particles will likely be distributed fairly evenly throughout the SCCO2 medium until water is present. When the aqueous solution is introduced, however, the ZTC particles will tend to aggregate on the surface of the aqueous solution even though they are hydrophobic. As the zeolite-templated carbon particles collect at the aqueous/SCCO2 interface, a layer of ZTC particles aggregate around the aqueous solution, as shown in FIG. 1. This ZTC layer serves to encapsulate the aqueous solution.

Although not wanting to be bound by theory, it is believed that due to the hydrophobic nature of the embodiments of the zeolite-templated carbon particles, Van der Walls forces between the $CO_2$ molecules in the SCCO2 and surfaces of the zeolite-templated carbon particles may be strong. This may have the effect of $CO_2$ molecules adsorbing to surfaces of the zeolite-templated carbon particles at SCCO2 conditions. As such, $CO_2$ molecules may pack more tightly near the surface of a capsule as compared to molecules in the bulk SCCO2 medium. This may result in an increase in the bulk density of SCCO2/capsule dispersion, which will mitigate the gravity override issue when in use in a formation or reservoir.

Method of Use in a Hydrocarbon-Bearing Formation

In another aspect, embodiments disclosed here relate to a method of using the previously-described embodiment dispersion in a hydrocarbon-bearing formation. As shown in FIG. 2, the embodiment dispersion comprising the embodiment capsules are shown traversing the pore structure of a reservoir.

As shown in FIG. 3, an embodiment method may include introducing the previously-described embodiment dispersion that comprises the embodiment capsules in SCCO2 into a subterranean formation, such as a hydrocarbon-bearing formation 308. Embodiment methods may include introducing a previously-formed embodiment dispersion having the previously-described embodiment capsules into a subterranean formation. In other embodiments, components of the dispersion may be introduced separately, meaning that the SCCO2, aqueous solution and ZTC particles may each be introduced separately into the formation, and embodiment dispersions may be formed in the subterranean formation in situ. Components of the dispersion may be added to the formation in any order. If introduced into the formation separately, the ZTC particles may be added as a dry powder or they may be suspended in a suitable solvent, such as crude oil, hydrocarbon fractions, such as naphtha, kerosene or diesel, or SCCO2. The ZTC particles may also be suspended in water provided it has surfactants to assist in suspension of the ZTC particles.

Figure 4:
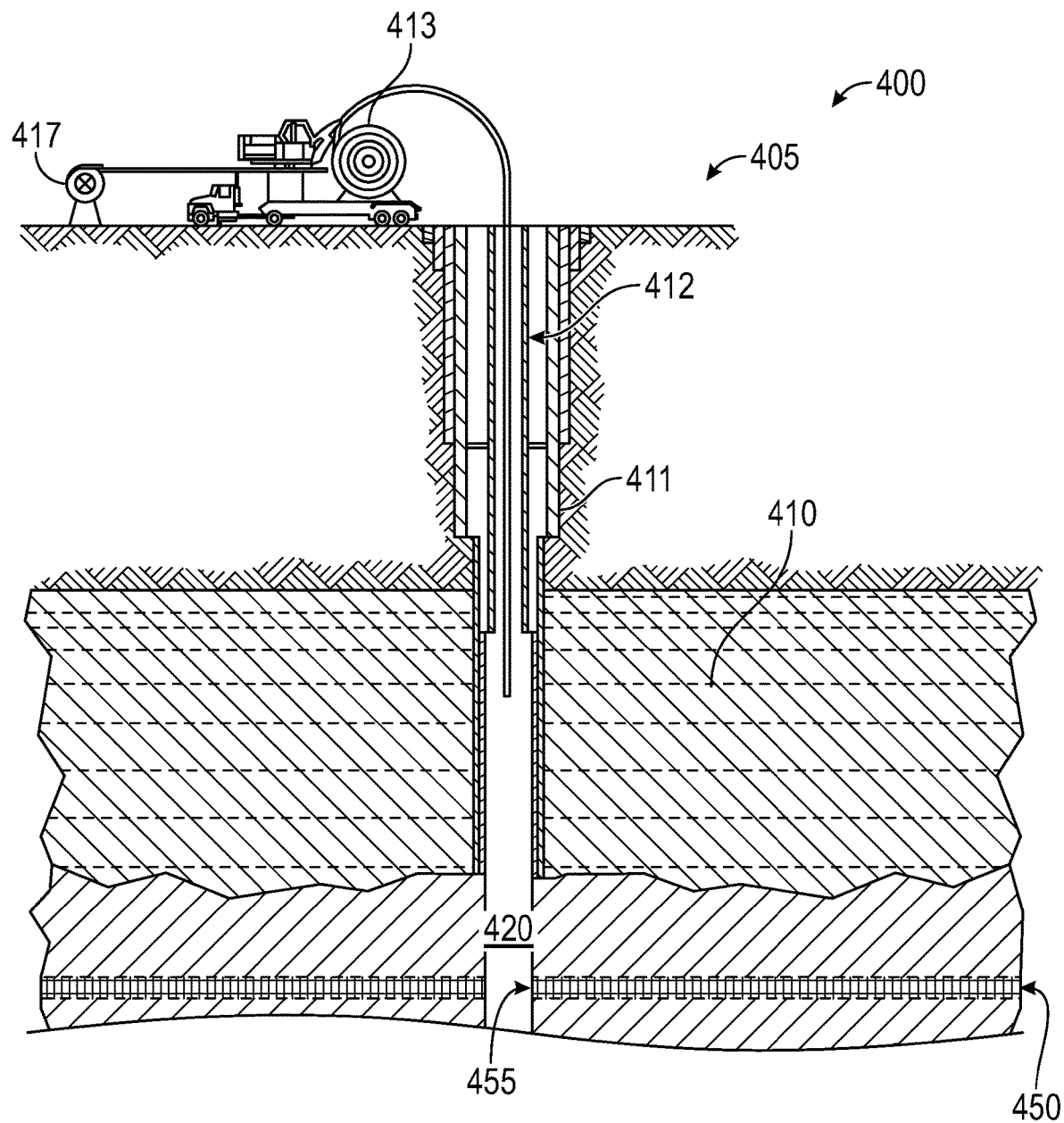
FIG. 4 is a simplified schematic of an embodiment hydrocarbon bearing formation.

FIG. 4 is a diagram that illustrates a well environment 400 in accordance with one or more embodiments. Well environment 400 includes a subsurface 410. Subsurface 410 is depicted having a wellbore wall 411 both extending downhole from a surface 405 into the subsurface 410 and defining a wellbore 420. The subsurface also includes target formation 450 to be treated. Target formation 450 has target formation face 455 that fluidly couples target formation 450 with wellbore 420 through wellbore wall 411. In this case, casing (412) and coiled tubing 413 extend downhole through the wellbore 420 into the subsurface 410 and towards target formation 450.

With the configuration in FIG. 4, the previously-described embodiment dispersion that comprises the embodiment capsules in critical or supercritical carbon dioxide may be introduced into the subsurface 410 and towards target formation 450 via a pump 417 through the coiled tubing 413. In another embodiment, as previously described, the dispersion may be formed in situ, meaning components of the dispersion ($CO_2$, aqueous solution, ZTC particles) may be introduced into the subsurface 410 separately via the pump 417 through the coiled tubing 413, forming the dispersion inside the target formation 450. In such embodiments, multiple pumps may be used to separately inject components of the dispersion.

Hydrocarbon-bearing formations may include any oleaginous fluid, such as crude oil, dry gas, wet gas, gas condensates, light hydrocarbon liquids, tars, and asphalts, and other hydrocarbon materials. Hydrocarbon-bearing formations may also include aqueous fluid, such as water and brines. Hydrocarbon-bearing formations may include formations with pores sizes of from about 100 nm to 100 μm. As such, embodiment capsules have sizes in an appropriate range to traverse pores of hydrocarbon-bearing formations. Embodiment dispersions may be appropriate for use in different types of subterranean formations, such as carbonate, shale, sandstone and tar sands.

Embodiments of the present disclosure may provide at least one of the following advantages. As described previously, embodiment dispersions may have greater density than bulk supercritical $CO_2$. As such, embodiment dispersions may not have the gravity override challenges associated with SCCO2 in enhanced oil recovery applications. The SCCO2 dispersion may traverse deeper into target formations to treat portions of the formation that have not been treated or that have been bypassed. The compositions and methods disclosed here may result in in higher oil recovery and increased oil production.

When the word "approximately" or "about" are used, this term may mean that there can be a variance in value of up to ±10%, of up to 5%, of up to 2%, of up to 1%, of up to 0.5%, of up to 0.1%, or up to 0.01%.

Although only a few example embodiments have been described in detail, those skilled in the art will readily appreciate that many modifications are possible in the example embodiments without materially departing from the envisioned scope. Accordingly, all such modifications are intended to be included within the scope of this disclosure as defined in the following claims. In the claims, means-plus-function clauses are intended to cover the structures described as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112 (f) for any limitations of any of the claims, except for those in which the claim expressly uses the words 'means for' together with an associated function.

What is claimed is:

1. A composition of matter comprising:
a dispersion of capsules in critical or supercritical carbon dioxide, the capsules comprising an aqueous solution encapsulated by zeolite-templated carbon particles.

2. The composition of claim 1, where the capsules have an aqueous solution diameter in a range of from about 10 nm to 100 μm.

3. The composition of claim 1, where the zeolite-templated carbon particles have a particle size in a range of from about 10 to 200 nm.

4. The composition of claim 1, where the zeolite-templated carbon particles are hydrophobic.

5. The composition of claim 1, where the capsules have a diameter in a range of from about 10 nm to 100 μm.

6. The composition of claim 1, where the dispersion comprises in a range of from about 60 to 70 vol. % of the aqueous solution.

7. The composition of claim 1, where the dispersion comprises up to 5.0 wt. % of the zeolite-templated carbon particles.

8. The composition of claim 1, where the dispersion has a bulk density in a range of from about 0.9 to 1.1 g/mL.

9. A method of making a dispersion of aqueous solution capsules, the method comprising:
providing a medium of critical or supercritical carbon dioxide;
introducing the aqueous solution into the critical or supercritical carbon dioxide medium; and
introducing a zeolite-templated carbon particle into the critical or supercritical carbon dioxide medium.

10. The method of claim 9, where the aqueous solution is introduced into the critical or supercritical carbon dioxide medium via a pump configured to introduce fluids at a temperature and pressure greater than a temperature of the critical or supercritical carbon dioxide medium and a pressure greater than a pressure of the critical or supercritical carbon dioxide medium.

11. The method of claim 9, where the aqueous solution and the zeolite templated carbon particle are introduced into the critical or supercritical carbon dioxide medium simultaneously.

12. The method of claim 9, where the aqueous solution is introduced into the critical or supercritical carbon dioxide medium prior to the zeolite templated particle being into the critical or supercritical carbon dioxide medium.

13. The method of claim 9, where the is zeolite templated particle introduced into the critical or supercritical carbon dioxide medium prior to the aqueous solution being into the critical or supercritical carbon dioxide medium.

14. The method of claim 9, where the zeolite-templated carbon particles have a particle size in a range of from about 10 to 200 nm.

15. The method of claim 9, where the dispersion has a bulk density in a range of from about 0.9 to 1.1 g/mL.

16. A method of treating a hydrocarbon-bearing formation comprising:
   introducing into the hydrocarbon-bearing formation a dispersion of aqueous solution capsules in a medium of critical or supercritical carbon dioxide, the aqueous solution capsules comprising an aqueous solution encapsulated by zeolite-templated carbon particles.

17. The method of claim 16, where the zeolite-templated carbon particles have a particle size in a range of from about 10 to 200 nm.

18. The method of claim 16, where the zeolite-templated carbon particles are hydrophobic.

19. The method of claim 16, where the dispersion comprises in a range of from about 60 to 70 vol. % of the aqueous solution.

20. The method of claim 16, where the dispersion comprises up to 5.0 wt. % of the zeolite-templated carbon particles.

* * * * *